United States Patent [19]

Ernst

[11] Patent Number: 4,763,417
[45] Date of Patent: Aug. 16, 1988

[54] MULTI-COORDINATE PROBE

[75] Inventor: Alfons Ernst, Traunreut, Fed. Rep. of Germany

[73] Assignee: Dr. Johannes Heidenhain GmbH

[21] Appl. No.: 20,553

[22] Filed: Mar. 2, 1987

[30] Foreign Application Priority Data

Mar. 2, 1987 [DE] Fed. Rep. of Germany ....... 3706767

[51] Int. Cl.⁴ ............................................... G01B 7/28
[52] U.S. Cl. ...................................... 33/169 R; 33/561
[58] Field of Search ................ 33/169 R, 172 E, 551, 33/552, 556, 557, 558, 559, 561, 503

[56] References Cited

U.S. PATENT DOCUMENTS 4,177,568 12/1979 Werner et al. .
4,549,356 10/1985 Ernst .................................. 33/169 R
4,558,312 12/1985 Yonemoto ........................ 33/552 X

FOREIGN PATENT DOCUMENTS 0028601 2/1983 Japan ................................ 33/169 R Primary Examiner—Harry N. Haroian
Attorney, Agent, or Firm—Toren, McGeady & Associates

[57] ABSTRACT

In a switching multicoordinate probe an accurate and accurately reproducible switching behavior is achieved by a plurality of bearing points, which all have the same elasticity. The bearing balls (14) and their countermembers (17) exhibit a sufficient number of degrees of freedom, in order to be able to accurately orient themselves with respect to each other during installation. After adjustment the contact zones of the individual bearing balls (14) with the inclined sectional surface (18) of their countermembers (17) form an accurate bearing arrangement for the probe retainer (10), which bearing arrangement lies in a plane prependicular to the stylus access (FIG. 1).

10 Claims, 4 Drawing Sheets

MULTI-COORDINATE PROBE

FIELD AND BACKGROUND OF THE INVENTION

The invention is directed to a multi-coordinate probe according to the preamble of claim 1. A plurality of measuring and switching multi-coordinate probes is known. In all types of probe it is of particular importance that the stylus after being deflected in any direction again returns to its defined zero position. Various attempts were therefore made to design a bearing arrangement of the stylus in the probe housing in a particularly advantageous fashion.

A probe is indicated in DE-OS No. 28 41 424 which comprises a three point bearing arrangement. Three V-grooves are arranged in star fashion in the probe housing base. Three pins with spherical surface are rigidly attached to the probe retainer. The probe retainer is urged by means of a spring in direction of the probe housing base and the pins assume a fixed position in the associated V-grooves, into which they are to return after a deviation of the stylus.

Furthermore from the EP-ANo. 2-0 088 596 a probe with a bearing arrangement is known which also exhibits three bearing points. The bearing or support points are distributed in one plane uniformly concentrically to the stylus axis. Three balls are arranged in the probe housing base, which for purpose of installation are displaceable parallel to the stylus axis. The three counterbearings at the probe retainer are designed differently. One counterbearing is designed as a security against twisting in the shape of a conical bore. The second counterbearing exhibits a V-groove, which is oriented fixedly towards the center point of the probe retainer. A third counterbearing is a flat support, perpendicular to the stylus axis and perpendicular to the force components of the pressure spring.

By means of differing constructions of the individual bearing or support points it was attempted in the state of the art indicated in the EP-ANo. 2-0 088 596 to avoid a static overdefinition but also an underdefinition. Because of the differing construction of the individual bearing points (ball/cone, ball/prism and ball/plane) the elasticity of the individual support points is, however, also different, which has an unfavorable effect upon the accuracy of the switching point.

These types of support arrangements are to be designated as classical support arrangements, which are shaped in accordance with the "Maxwell Conditions" (see M. Pollermann, "Components of Physical Technology", 2nd Edition, Chapter 4 Guides and Support Arrangements-; Springer Publishing House 1972).

On top of that it is known in multicoordinate probes that measuring force differences and the connected therewith switching point differences caused by bending at different probing directions are reduced by increasing the quantity of the bearing or support points. An increase of the quantity of the bearing points raises however the costs for the fabrication of the close tolerance bearing points to a considerable degree, and there exists the danger that the system becomes statically overdefined. As an example for a probe with several bearing points the DE-OS No. 27 42 817 is mentioned.

There, a group of balls is concentrically arranged at the probe retainer in a V-groove. In the housing there is located also a concentric V-groove in which a second group of balls is located. The groups of balls lie opposite each other and each ball of the one group of balls is located between two adjacent balls of the other group of balls.

Each ball has a surface which can come to rest at the two curved surfaces of two adjacent balls. A spring urges the probe retainer toward the housing, and the balls touch each other with their surfaces at points because of the prestress exerted by the spring.

In order to assure that the desired contact occurs between each group of the individual group of balls and two adjacent balls of the other group of balls, the balls are to start off with allowed to freely roll in their grooves, where they then assume positions because of the spring force and the curvature of the surfaces, in which all balls of the one group of balls contact all balls of the other group of balls. The surfaces formed by two adjacent balls of the one group of balls are naturally curved in the same manner with respect to each other as the surfaces of two adjacent balls of the other group of balls and both groups of balls behave in the same manner as far as assuming the mutual positions in the grooves is concerned. In order to attain a complete and rapid orientation of the balls, a comparatively strong spring can be used and the probe can be vibrated, wherein the stylus is axially retained by means of a fixture.

The balls are arranged and oriented in the manner described, while the epoxy resin introduced previously into the grooves is still soft. The resin serving as cement then hardens, while the relative position of the housing and the stylus is maintained without change.

In this type of bearing arrangement of the stylus all contact points have the same elastic properties, but the installation is relatively cumbersome.

SUMMARY OF THE INVENTION

The present invention is based upon the task of creating a bearing arrangement for a multicoordinate probe, which assures a high and easily reproducible switching accuracy, which consists of simple basic building blocks and is comparatively easy to install.

This task is solved by a multicoordinate probe with the characteristics of claim 1. The subclaims indicate advantageous refinements of the invention with which also a security against twisting can be realized.

The particular advantages of the invention are seen in that the surface regions in the form of sectional planes at each individual support point merely contact the surfaces of the bearing members tangentially and can freely locate themselves. The fabrication of the countermembers is very simple, since an oblique section with respect to the axis of rotation of the cylindrical countermembers can be achieved in many ways. No particular requirement must be specified as far as the quality of the surface is concerned since in any case only a respective point contact is being provided. In order to prevent an overdefinition, the bearing members as well as the countermembers associated with them can exhibit a sufficient number of degrees of freedom for the mutual adaptation and adjustment during installation.

BRIEF DESCRIPTION OF THE DRAWINGS

The invention is described with embodiment examples and the help of drawings.

In the drawings.

DESCRIPTION OF THE PREFERRED EMBODIMENTS

Figure 1:
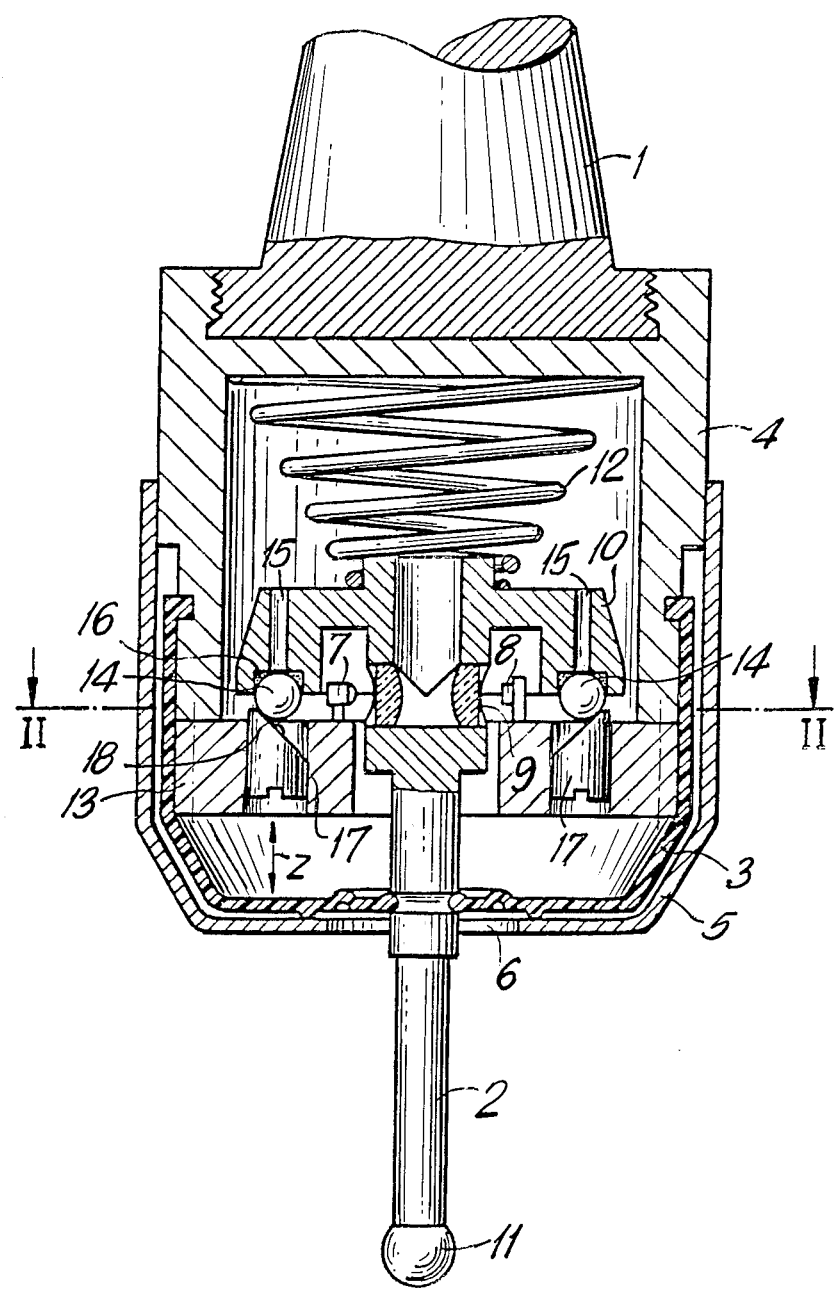
FIG. 1 is an axial section through a probe.

The overall construction of a multicoordinate probe is discernible from FIG. 1. The probe shown is designed as a switching probe. The probe can be inserted into a spindle of a measuring- or machining tool, not shown here, by means of a cone 1. The deviation of the stylus 2 is possible in nearly all directions. A seal 3 closes the intermediate space between a probe housing 4 and the stylus 2. A metal protective cover 5 prevents damaging the seal 3 by hot chips; it however leaves a free space 6 which permits the stylus 2 to be deviated to a limited extent from its zero position.

A detecting arrangement 7, 8, 9 for determination of the deviation of the stylus 2 supplies a probing pulse at a certain deviation magnitude, which is utilized for controlling of a machine tool or for determination of the instant of the measuring value transfer to a coordinate measuring machine. The detecting arrangement 7, 8, 9 consists of an optical transmitter 7 fixed in the probe housing 4 and an aligned therewith also fixed differential photoelectric cell 8. A lens system 9 is fixedly fastened at the movable stylus 2 in the optical axis of the two elements 7, 8.

The probe retainer 10 is rigidly connected with the stylus 2, which at its free end has a probing ball 11. One surface of the probe retainer 10 is in connection with the probe housing 4 by means of a spring 12. The counter-surface is a part of the bearing arrangement between the probe retainer 10 and the probe housing base 13. This bearing arrangement must be accurately constructed, since a static under- or overdefinition causes measuring errors, if an adequate reproducibility is not assured.

In the course of a probing process at a workpiece the probe retainer 10 is kept as long in its zero position by the spring 12, as its force counteracts the effect of the contact pressure of the probing ball 11 upon the workpiece. The spring 12 prevents the probe retainer 10 to be pivoted in the bearing arrangement or lifted from same, if the probing force lies below a certain value. As long as the probe retainer 10 is pressed by the spring 12 against the probe housing base 13, the probe retainer 10 and the probe housing 4 form one unit with the degree of freedom zero. During a deflection the spring 12 is stressed in such a manner that it returns the probe retainer 10 against the probe housing base 13 if the probing force tapers off.

The bearing arrangement, constructed as a multiple point support consists in the invention of balls 14 equally distributed around the circumference of the probe retainer 10 and arranged in one plane, which balls are anchored in the probe retainer 10. A bore 15 at the attachment base of each ball 14 serves for the supply of cement 16 and for driving an eventually damaged ball 14 through. A cylinder by way of a counter member 17 is assigned to each of the sixteen balls 14. The countermembers 17 are aligned in such a manner, that their longitudinal axes are located parallel to the longitudinal axis of the stylus 2 resting in its zero position. So that the probe retainer 10 can assume a defined position by means of each ball 14, each countermember 17 is supported to be rotatable around its longitudinal axis as well as being displaceable in direction of its longitudinal axis.

The countermembers 17 are beveled obliquely with respect to their axis of rotation. The sectional planes result respectively in a flat surface 18. Alternately the sectional planes can also be curved in cylindrical or spherical fashion. By such a design of the countermembers 17 the security against twisting of the probe retainer 10 can be increased.

The core of the present invention is however the orientation of the countermembers 17 with respect to each other and with respect to the balls 14. The countermembers 17 are rotated with respect to each other and to the axis, so that the inclined sectional planes 18 are oriented either inward or outward, and this indeed alternately. Each of the balls 14 thus rests either at a radially outwardly directed or a radially inwardly directed inclined sectional plane 18 of the countermember 17. In their entirety the thus oriented countermembers 17 provide an accurate bearing arrangement for the probe retainer 10.

Since the countermembers 17 can be easily rotated around their axes and also axially displaced, they can be matched very well to the balls 14 of the probe retainer 10.

After the relatively easily accomplishable initial adjustment of the countermembers 17, these are rigidly connected with the probe housing base 13, preferably they are cemented in. Each bearing point is thus constituted by the coaction of the surface regions of the balls 14 with the sectional planes 18 of the countermembers 17 rigidly arranged in the probe housing 4 or its base 13.

An accurate and simple orientation of the inclined sectional surfaces 18 of the countermembers 17 with respect to the balls 14 is achieved in that during assembly the countermembers 17 are automatically, rapidly and completely oriented by means of a not shown vibration device; this occurs prior to hardening of the cement which is meant to fix the countermembers 17 in the probe housing base 13 after assembly. The vibration device comprises a spring arrangement which adjusts each cylindrical member 17 in the Z-direction. By continuous reduction of the high frequency vibration amplitudes it is assured that with increasing degree of hardening of the cement the cylindrical members 17 additionally rotate into a stable position around their proper axis. Herein naturally an initial rough orientation is required wherein the inclined sectional surfaces 18 are alternately placed one opposite the other.

The cylindrical members may must not necessarily be a component of the probe housing base 13, as has been illustrated in the embodiment example. They can be equally well integrated into the probe retainer. In this case the balls must then be fixed in the probe housing base. Furthermore other pairings of the bearing elements are possible in addition to the possibilities shown:

for instance pins with spherical surface/ countermembers.

Figure 2:
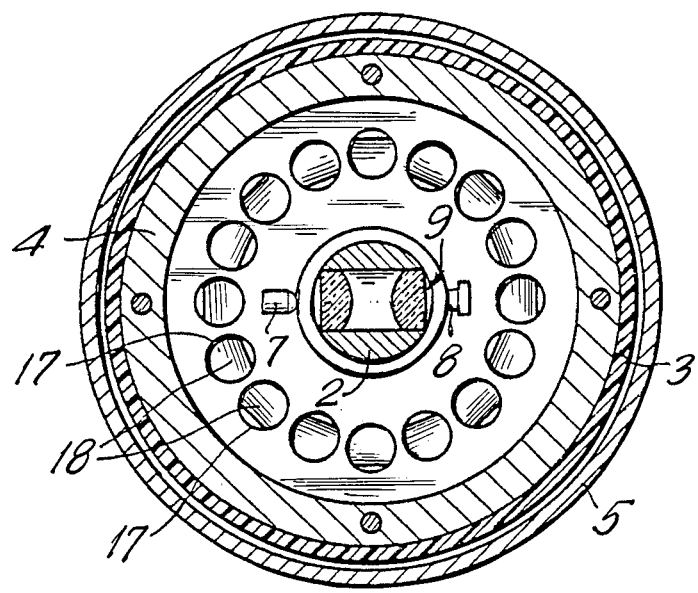
FIG. 2 is a section along the line II—II of the probe from FIG. 1 with the probe retainer removed.

It is shown in the section from FIG. 2, that all countermembers 17 lie concentrically with respect to the not designated stylus axis. The sectional surfaces 18 of the countermembers 17 can be recognized in the plan view. Since the countermembers 17 are attached in the stylus housing base 13 so as to be rotatable around their longitudinal axes, the position of the sectional planes 18 depends upon the attitude of the countermembers 17.

Figure 3:
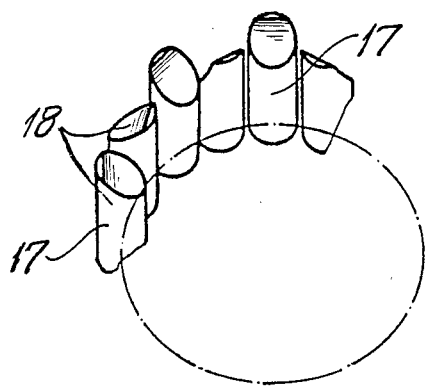
FIG. 3 shows a number of cylindrical countermembers in schematic presentation.

FIG. 3 shows a quantity of countermembers 17. Other components are intentionally not depicted. It can be easily recognized at the individual countermembers 17, that the surfaces of their inclined sectional surfaces 18 are directed alternately outwards or inwards. It can be easily recognized in this drawing, that the bearing balls 14 if they contact the respective sectional surface 18, are securely and accurately locked by the countermembers 17.

Figure 4:
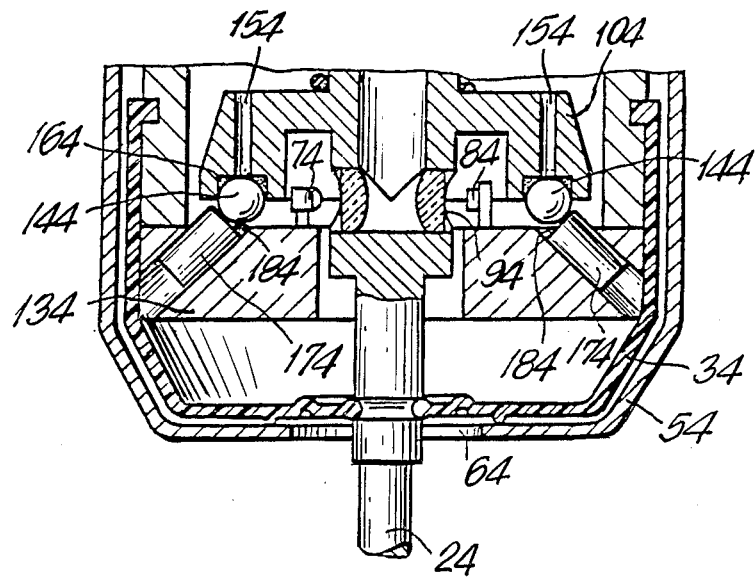
FIG. 4 is a cutout of the probe with inclined face support cylinders and FIG. 5 is a cutout of the probe with shaped parts and inclined support faces.

In FIG. 4 another embodiment form for the design of the inventive bearing arrangement of a probe retention 104 is shown in the cutout of the probe. Bores extending obliquely with respect to the axis of the stylus 24 are arranged in the probe housing base 134, into which the cylinders 174 are fitted. The cylinders 174 are supported to be longitudinally displaceable in the probe housing base 134 and their end faces 184 touch the balls 144 of the stylus bearing arrangement. The probe retainer 104 is in this manner supported to be centered exactly in the same manner as in the first embodiment example. Herein it is assumed that the cylinders 74 are directed with their end faces 184 in the same manner alternately radially inwards or radially outwards, as this has been described in the embodiment example according to FIGS. 1–3. The assembly and final adjustment occurs in analogous manner as in the previously described example.

The remaining elements in FIG. 4 are equivalent to those of FIG. 1, but with the addition of the suffix "4" to each reference numeral.

Figure 5:
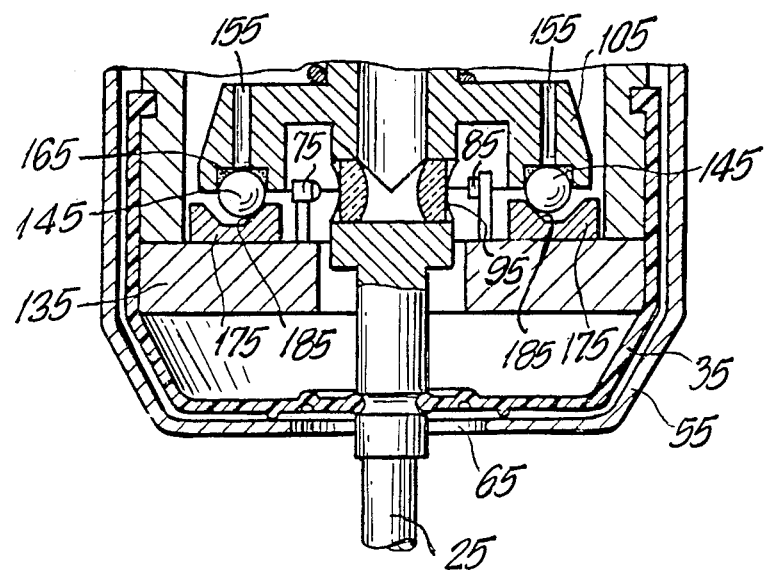

Another solution is represented in the embodiment example in FIG. 5. Shaped members 175 by way of countermembers are arranged on the plane of the stylus housing base 135 concentrically with respect to the axis of the stylus 25, which shaped members are respectively radially displaceable. The shaped members 175 exhibit inclined surfaces 185, which rest tangentially at the bearing members of the probe retention 105 formed by the balls 145. It is discernible from the illustration, that the shaped members 175 are designed to be symmetrical. This means for the assembly that identical members 175 form the bearing arrangement of the probe retainer, wherein merely alternately the external or the internal shaped inclined face 185 is made to contact the balls. For this only a radial displacement of the respective shaped member 175 is required. After the assembly is finished the members 175 are fixed upon the probe housing base 135.

There again, the remaining elements in FIG. 5 are equivalent to those of FIG. 1, but with the suffix "5".

Figure 6:
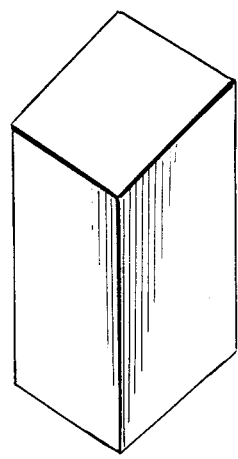
FIG. 6 is a perspective view showing a countermember in the form of a prism.
Figure 7:
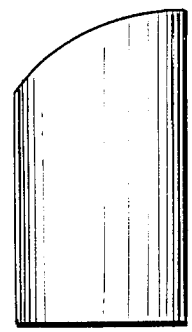
FIG. 7 is a side elevational view of a countermember having a cylindrically curved surface.
Figure 8:
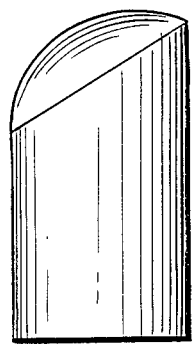
FIG. 8 is a side elevational view of a coutermember having a spherical curved surface.
Figure 9:
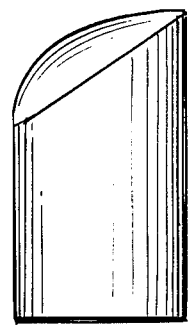
FIG. 9 is a side elevational view of a countermember having a curved non-spherical support surface.

FIG. 6 shows the case where the countermembers are each in the form of a prism. FIG. 7 shows the case where the countermembers are each in the form of a cylinder having a support surface in the form of a cylindrically curved surface. FIG. 8 shows the case where each countermember is in the form of a cylinder having a support surface in the form of a spherically curved surface. FIG. 9 shows the case where each countermember is in the form of a cylinder having a support surface which curves in a non-spherical manner.

The specialist will be able to indicate other embodiments within the framework of the invention.

I claim:

1. Multi-coordinate probe with at least one stylus deflectible into several coordinate directions, which is urged by a restoring force into a bearing arrangement determining its defined zero positions, said bearing arrangement being formed by the coaction of surface regions of several bearing members with surface regions of a corresponding number of countermembers, wherein the bearing members and the associated countermembers are arranged as much as possible concentrically around the probe axis and are at least one of radially and axially adjustable, characterized in that each countermember (17, 174, 175) comprises a support surface (18, 184, 185) for respectively one bearing member (14, 144, 145), wherein the support surfaces (18, 184, 185) extend obliquely to the axis of the stylus (2, 24, 25) and are oriented respectively one of radially inward and radially outward, so that each bearing member (14, 144, 145) is in tangential contact with one of a radially inwardly and radially outwardly extending support surface (18, 184, 185).

2. Multi-coordinate probe according to claim 1, characterized in that the support surfaces are formed by sectional planes (18) of cylinders (17) cut obliquely with respect to their longitudinal axes, which cylinders are inserted parallel to the axis of the stylus (2) into the probe housing base (13).

3. Multi-coordinate probe according to claim 1, characterized in that the support surfaces are formed by end faces (184) of cylinders (174) whose longitudinal axes extend obliquely to the axis of the stylus (24).

4. Multi-coordinate probe according to claim 1, characterized in that the support surfaces formed by surface regions (185) of shaped bodies (175), which extend obliquely with respect to the axis of the stylus (25).

5. Multi-coordinate probe according to claims 1 or 2, characterized in that the support surfaces (18, 184, 185) are flat surfaces.

6. Multi-coordinate probe according to claims 1 or 2, characterized in that the support surfaces are cylindrically curved surfaces.

7. Multi-coordinate probe according to the claims 1 or 2, characterized in that the support surfaces are spherically curved surfaces.

8. Multi-coordinate probe according to claims 1 or 2, characterized in that the support surfaces are surfaces curved in a non-spherical manner.

9. Multi-coordinate probe according to claim 1, characterized in that the support surfaces alternate between being oriented radially inwardly and radially outwardly.

10. Multi-coordinate probe according to claim 1, characterized in that the support surface is formed by end faces of prisms whose longitudinal axes extend obliquely to the axis of the stylus.

* * * * *